(12) United States Patent
Wu

(10) Patent No.: US 12,310,473 B1
(45) Date of Patent: May 27, 2025

(54) LUMINESCENT EARPHONE COMPARTMENT

(71) Applicant: Hanglei Wu, Lufeng (CN)

(72) Inventor: Hanglei Wu, Lufeng (CN)

( * ) Notice: Subject to any disclaimer, the term of this patent is extended or adjusted under 35 U.S.C. 154(b) by 0 days.

(21) Appl. No.: 19/059,448

(22) Filed: Feb. 21, 2025

(51) Int. Cl.
*A45C 11/00* (2006.01)
*A45C 15/06* (2006.01)
*H02J 7/00* (2006.01)
*H04R 1/10* (2006.01)

(52) U.S. Cl.
CPC ............ *A45C 11/001* (2025.01); *A45C 15/06* (2013.01); *H02J 7/0044* (2013.01); *H04R 1/1025* (2013.01); *A45C 2200/10* (2013.01)

(58) Field of Classification Search
CPC ... A45C 11/001; A45C 15/06; A45C 2200/10; H04R 1/1025; H04R 1/1016; H02J 7/0044
USPC .... D14/205, 223, 224, 209.1; D13/103, 107
See application file for complete search history.

(56) References Cited

U.S. PATENT DOCUMENTS

| | | | | |
|---|---|---|---|---|
| D723,531 S | * | 3/2015 | Katzke | D14/250 |
| D981,998 S | * | 3/2023 | Chen | D14/250 |
| 11,949,242 B1 | * | 4/2024 | Liao | H02J 50/005 |
| 2018/0320859 A1 | * | 11/2018 | Philip | F21V 3/08 |
| 2019/0013832 A1 | * | 1/2019 | Mody | H04M 1/0202 |
| 2021/0085047 A1 | * | 3/2021 | Wright | A45C 11/00 |

* cited by examiner

*Primary Examiner* — Jason R Kurr
(74) *Attorney, Agent, or Firm* — Birchwood IP

(57) ABSTRACT

A luminescent earphone compartment is provided, which includes a compartment body and a compartment cover. One end of the compartment cover is hinged to one end of the compartment body, a first decorative cover is fixedly connected to one side of the compartment body. A first decorative cavity is formed between the compartment body and the first decorative cover, a second decorative cover is fixedly connected to one side of the compartment cover, a second decorative cavity is formed between the compartment cover and the second decorative cover. The first decorative cavity is filled with a first filling material, and the second decorative cavity is filled with a second filling material. The first filling material can flow in the first decorative cavity, and the second filling material can flow in the second decorative cavity. Thus, the appearance structure of the earphone compartment presents a mobility change effect.

10 Claims, 10 Drawing Sheets

LUMINESCENT EARPHONE COMPARTMENT

TECHNICAL FIELD

The present disclosure relates to the field of earphone compartment technologies, and in particular, to a luminescent earphone compartment.

BACKGROUND

Bluetooth earphones, as one of the most popular music playback devices today, are highly favored by young people for their information transmission through Bluetooth wireless connection. Currently, Bluetooth technology is basically mature, and consumers will pay more attention to the appearance of Bluetooth earphones and their earphones in similar price ranges.

The existing Bluetooth earphone compartment generally includes a compartment body and a compartment cover. The compartment body is provided with a charging chamber, which is used to place Bluetooth earphones and charge them. One end of the compartment cover is rotatably connected to the compartment body, and when the compartment cover abuts against the other end of the compartment body, the compartment cover closes the charging chamber. The difference in appearance of existing earphone compartments is mainly achieved through the combination of fixed colors and fixed structures so as to achieve differentiation and specialization.

Regarding the relevant technologies mentioned above, when the earphone compartment is manufactured, the fixed color and structural design make the appearance and structure of the earphone compartment less likely to change during use, resulting in a relatively monotonous appearance.

SUMMARY

In order to provide a certain degree of variability in the appearance structure of the earphone compartment during use, this application provides a luminescent earphone compartment.

The liquid luminescent earphone compartment provided in the present application adopts the following technical solution.

A luminescent earphone compartment, including a compartment body and a compartment cover, where one end of the compartment cover is hinged to one end of the compartment body, a first decorative cover is fixedly connected to one side of the compartment body away from the compartment cover, a first decorative cavity is formed between the compartment body and the first decorative cover, a second decorative cover is fixedly connected to one side of the compartment cover away from the compartment body, a second decorative cavity is formed between the compartment cover and the second decorative cover, the first decorative cavity is filled with a first filling material, and the second decorative cavity is filled with a second filling material; the first filling material is capable of being flowed in the first decorative cavity, and the second filling material is capable of being flowed in the second decorative cavity; both the first decorative cover and the second decorative cover are made of transparent material.

By adopting the above technical solution, the first filling material flows in the first decorative cavity and the second filling material flows in the second decorative cavity during the use of the earphone compartment, thus presenting a gradually changing effect on an appearance structure of the earphone compartment, thereby improving the fixed color and structural design when the earphone compartment is manufactured, and rendering the appearance structure of the earphone compartment less likely to change during use, which results in a relatively monotonous problem during use.

In some embodiments of the present application, the first filling material and the second filling material are made of the same material; both the first filling material and the second filling material include particulate matter of a luminescent material.

By adopting the above technical solution, the earphone compartment has a fluorescent effect in dark environments, which further enriches the aesthetic structure of the earphone compartment and increases the fun of its appearance. Besides that, it renders it easier for a user to find the earphone compartment in dark environments, rendering it more user-friendly.

In some embodiments of the present application, the first filling material and the second filling material further include an oil substance, both the first filling material and the second filling material are composed of a mixture of the particulate matter and the oil substance.

By adopting the above technical solution, the first filling material flows more slowly in the first decorative cavity, thereby better displaying the fluidity of the first filling material, and the second filling material flows more slowly in the second decorative cavity, thereby better displaying the fluidity of the second filling material and improving its usability.

In some embodiments of the present application, a first connection ring is fixedly connected to one side of the compartment body close to the compartment cover, and a first connection groove is provided on the first decorative cover; when the first decorative cover is connected to the compartment body, the first connection ring runs through the first connection groove, a width of the first connection ring is 1.5 times or more a depth of a groove body of the first connection groove;

a second connection ring is fixedly connected to one side of the compartment cover close to the compartment body, the second decorative cover is provided with a second connection groove; when the second decorative cover is connected to the compartment body, the second connection ring runs through the second connection groove, a width of the second connection ring is 1.5 times or more a depth of a groove body of the second connection groove.

By adopting the above technical solution, a distance between the compartment body and the first decorative cover is not easily too narrow, so that the first filling material flows more smoothly in the first decorative cavity; and a distance between the compartment cover and the second decorative cover is not easily too narrow, so that the second filling material flows more smoothly in the second decorative cavity, which results in better usability.

In some embodiments of the present application, the first connection ring is fixedly connected to a first sealing ring, and when the first connection ring runs through the first connection groove, the first sealing ring abuts against the groove body of the first connection groove and seals a connection position between the first connection ring and the first connection groove;

the second connection ring is fixedly connected to a second sealing ring; when the second connection ring runs through the second connection groove, the second sealing ring abuts against the groove body of the second connection groove and seals a connection position between the second connection ring and the second connection groove.

By adopting the above technical solution, the setting of the first sealing ring and the second sealing ring improves the connection sealing between the compartment body and the first decorative cover, as well as the connection sealing between the compartment cover and the second decorative cover. This renders it difficult for the first filling material to flow out of the first decorative cavity and the second filling material to flow out of the second decorative cavity, which results in better usability.

In some embodiments of the present application, the compartment body is provided with a first filling hole that is penetrated, the first filling hole is communicated with the first decorative cavity; the compartment cover is provided with a second filling hole that is penetrated, the second filling hole is communicated with the second decorative cavity.

By adopting the above technical solution, the setting of the first filling hole and the second filling hole renders the filling of the first filling material in the first decorative cavity simpler and more convenient, and the filling of the second filling material in the second decorative cavity simpler and more convenient, which results in better usability.

In some embodiments of the present application, the compartment body includes a protective part and an accommodation part, the accommodation part is fixedly connected to the protective part, and the accommodation part is provided with two accommodation slots, the two accommodation slots are configured to accommodate Bluetooth earphones, and the two accommodation slots are communicated.

In some embodiments of the present application, each of the two accommodation slots include a first slot, a second slot, and a third slot; where the first slots are configured to accommodate a main body of the Bluetooth earphones, the second slots are communicated to each other and configured to accommodate a middle of the Bluetooth earphones, and the third slots are configured to accommodate an end of the Bluetooth earphones.

By adopting the above technical solution, the first slots accommodate the main position of the Bluetooth earphone, and the third slots accommodate the end position of the Bluetooth earphone, so that the limiting effect of the Bluetooth earphones is better when the accommodation slots accommodate the Bluetooth earphones, rendering it difficult for the Bluetooth earphones to move. Furthermore, the second slots are communicated to each other, rendering the space utilization of the two accommodation cavities better, reducing the length and size of the compartment body, and improving the usability.

In some embodiments of the present application, the other end of the compartment body is fixedly connected to a first magnet, and the other end of the compartment cover is fixedly connected to a second magnet; when the compartment body is connected to the compartment cover, the first magnet and the second magnet are magnetically attracted and fixed.

In some embodiments of the present application, a control module is fixedly provided in the compartment body; the control module is fixedly and electrically connected to a charging module; the compartment body is provided with a charging port that is penetrated, and the charging module is penetrated and clamped to fit with the charging port.

In summary, this application includes at least one beneficial technical effect as follows.

When using the earphone compartment, the first filling material flows in the first decorative cavity, and the second filling material flows in the second decorative cavity, thus presenting a gradually changing effect on the appearance structure of the earphone compartment. This improves the fixed color and structural design when the earphone compartment is manufactured, rendering the appearance structure of the earphone compartment less likely to change during use and appear monotonous during use.

The earphone compartment has a fluorescent effect in dark environments, further enriching the aesthetic structure of the earphone compartment and increasing the fun of its appearance. Besides that, it renders it easier for a user to find the earphone compartment in dark environments, which results in better usability.

Furthermore, the first filling material flows more slowly in the first decorative cavity, thereby better displaying the fluidity of the first filling material, and the second filling material flows more slowly in the second decorative cavity, thereby better displaying the fluidity of the second filling material and improving the usability.

Numeral reference: 1—compartment body; 11—first magnet; 12—first decorative cover; 121—first decorative cavity; 122—first filling material; 123—first connection groove; 13—first connection ring; 131—first sealing ring; 14—first filling hole; 15—protective part; 16—accommodation part; 161—accommodation slot; 1611—first slot; 1612—second slot; 1613—third slot; 17—control module; 171—charging module; 172—charging rod; 18—charging port; 2—compartment cover; 21—second magnet; 22—second decorative cover; 221—second decorative cavity; 222—second filling material; 223—second connection groove; 23—second connection ring; 231—second sealing ring; 24—second filling hole; 10—earphone compartment; 20—Bluetooth earphone.

DESCRIPTION OF EMBODIMENTS

Further detailed explanation of the present application will be provided in combination with FIGS. 2-9.

Figure 1:
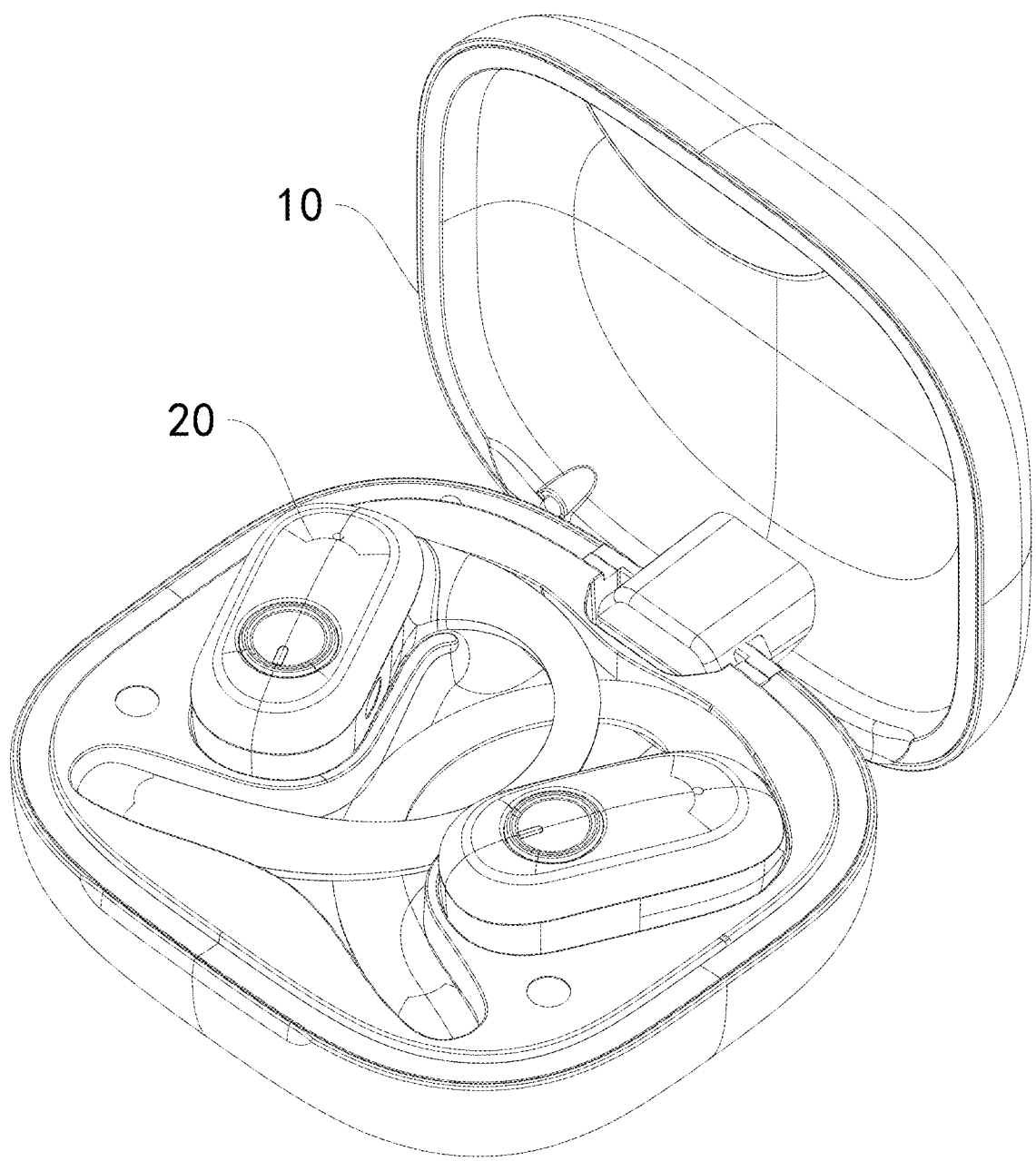
FIG. 1 is a schematic structural diagram of an earphone compartment and Bluetooth earphones.
Figure 2:
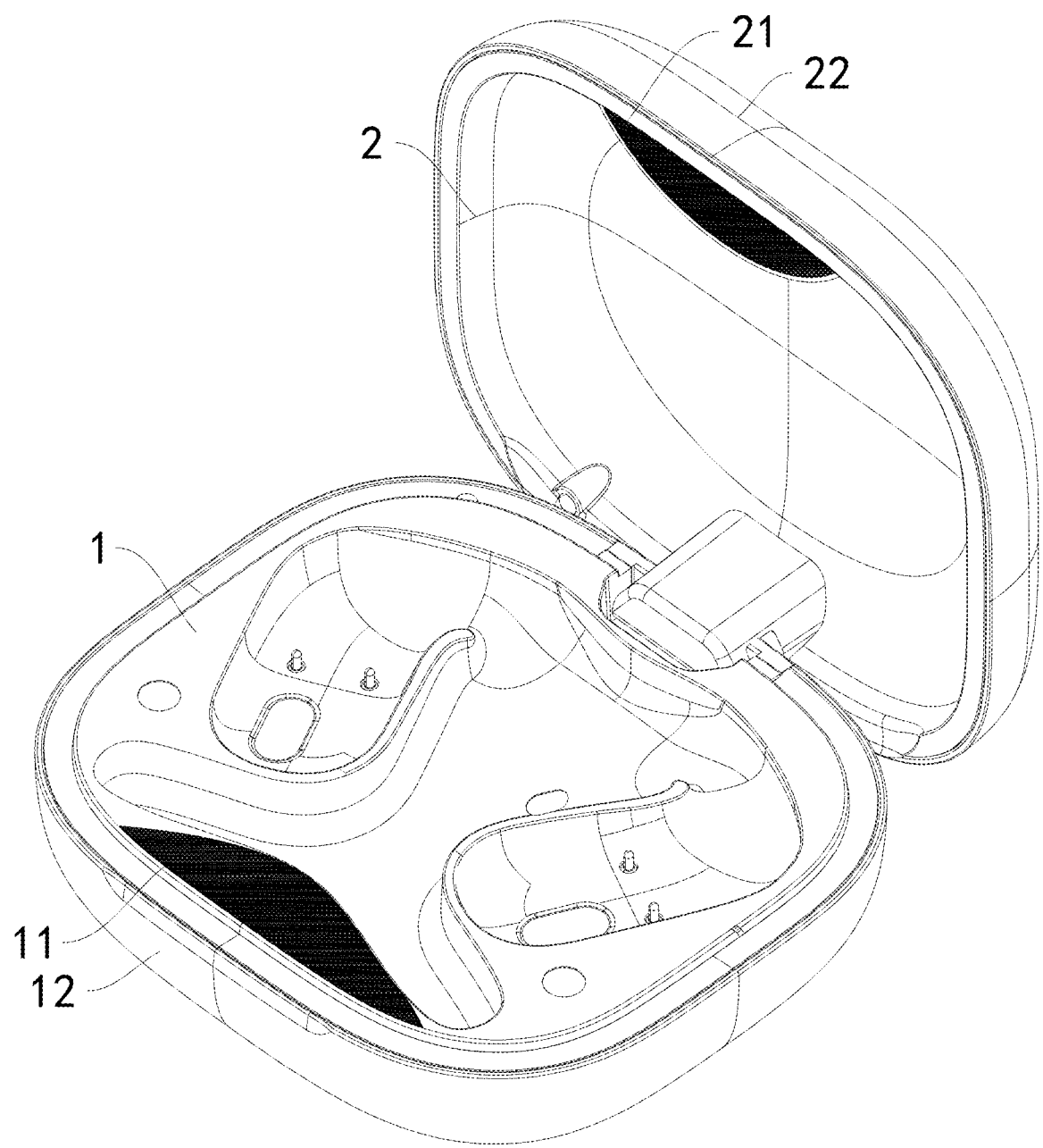
FIG. 2 is a first schematic diagram of an overall structure of an embodiment of the present application.

The embodiment of the present application discloses a luminescent earphone compartment. Referring to FIGS. 2 and 3, the luminescent earphone compartment includes a compartment body 1 and a compartment cover 2.

Figure 3:
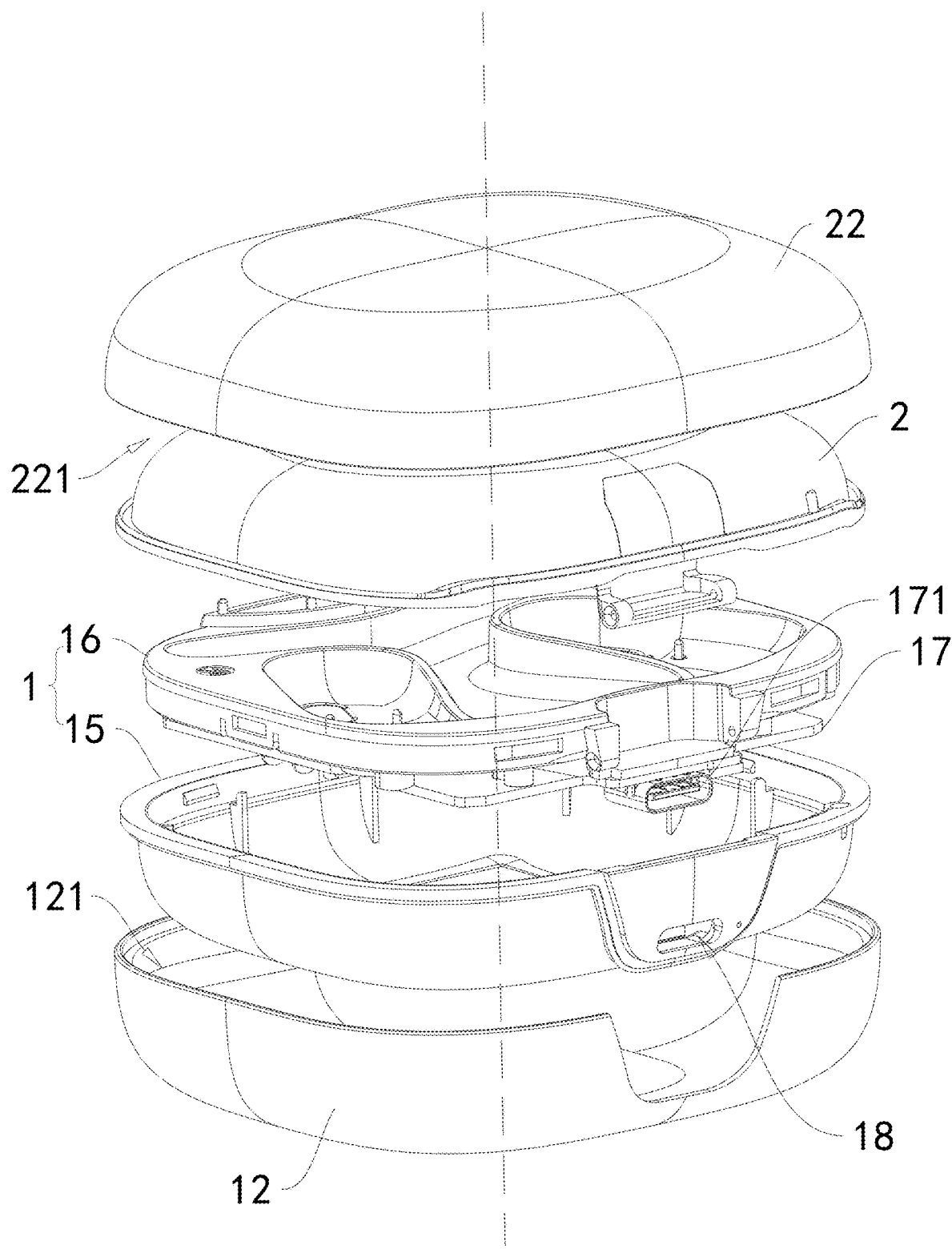
FIG. 3 is a schematic diagram of an explosive structure of an embodiment of the present application.

Referring to FIGS. 2 and 3, cross-sections of the compartment body 1 and the compartment cover 2 are both rectangular. One end of the compartment cover 2 is hinged to one end of the compartment body 1; the other end of the compartment body 1 is fixedly connected to a first magnet 11. The other end of the compartment cover 2 is fixedly connected to a second magnet 21. When the compartment body 1 covers the compartment cover 2, the first magnet 11 and the second magnet 21 are magnetically attracted and fixed, thereby fixing the compartment body 1 and the compartment cover 2.

Figure 4:
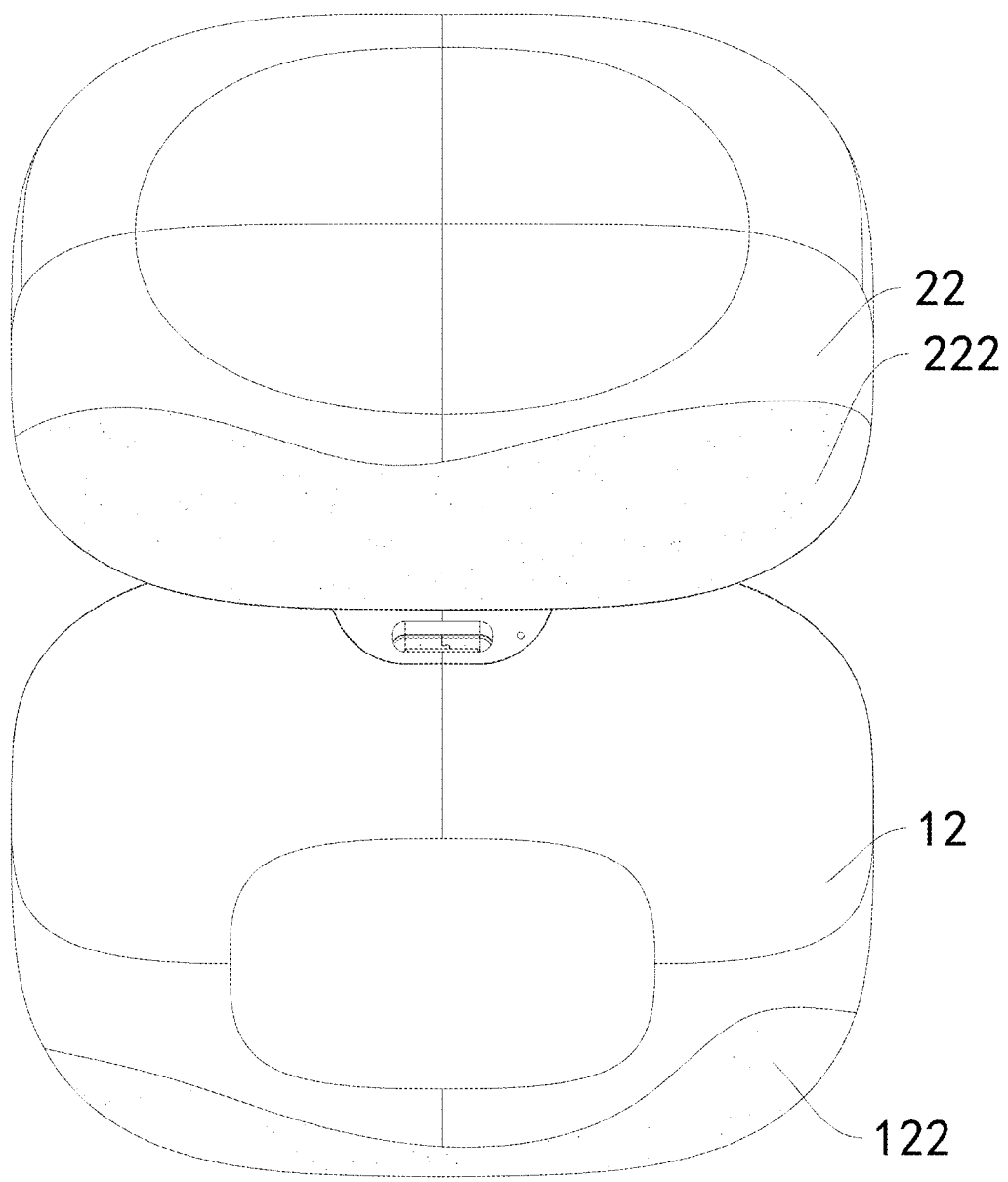
FIG. 4 is a second schematic diagram of the overall structure of the embodiment of the present application.

Referring to FIGS. 3 and 4, a first decorative cover 12 is fixedly connected to one side of the compartment body 1 away from the compartment cover 2, thereby forming a first decorative cavity 121 between the compartment body 1 and the first decorative cover 12. A second decorative cover 22 is fixedly connected to one side of the compartment cover 2 away from the compartment body 1, thereby forming a second decorative cavity 221 between the compartment cover 2 and the second decorative cover 22. In this embodiment of the present application, both the first decorative cover 12 and the second decorative cover 22 are made of transparent materials. The first decorative cavity 121 can be observed through the first decorative cover 12, and the second decorative cavity 221 can be observed through the second decorative cover 22.

Referring to FIGS. 3 and 4, the first decorative cavity 121 is filled with a first filling material 122, and the second decorative cavity 221 is filled with a second filling material 222. The materials of the first filling material 122 and the second filling material 222 are the same. Both the first filling material 122 and the second filling material 222 include particle substances of the light storage type self-luminous material and oil substances. The particle substances of the light storage type self-luminous material in this embodiment of the present application have the effect of absorbing ultraviolet light for self-luminescence.

Referring to FIGS. 3 and 4, the first filling material 122 can flow in the first decorative cavity 121, and the second filling material 222 can flow in the second decorative cavity 221. At the same time, the particles of the self-luminous material that store light render the earphone compartment have a fluorescent effect in dark environments, further enriching the ornamental structure of the earphone compartment and increasing its appearance. Besides that, it renders it easier for a user to find the earphone compartment in dark environments. In addition, the oil substance renders the first filling material 122 flows more slowly in the first decorative cavity 121, thereby better displaying the fluidity of the first filling material 122 and rendering the second filling material 222 flows more slowly in the second decorative cavity 221. Thus, the fluidity of the second filling material 222 can be better demonstrated.

Figure 5:
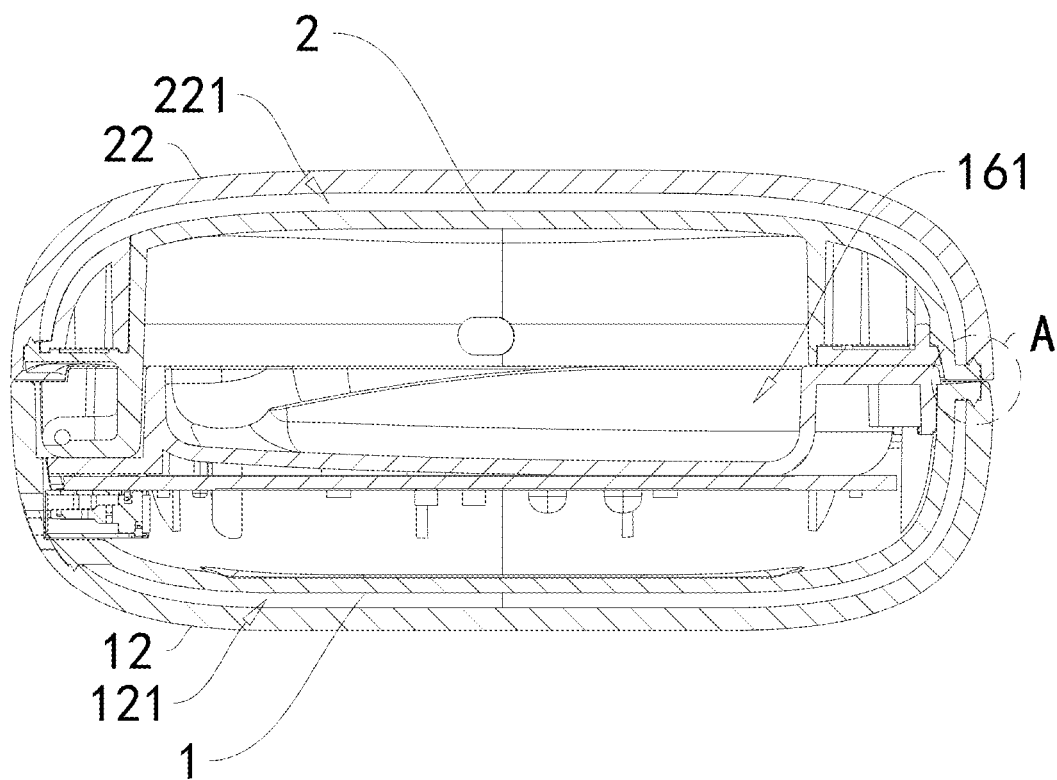
FIG. 5 is a sectional view of the overall structure of the embodiment of the present application.
Figure 6:
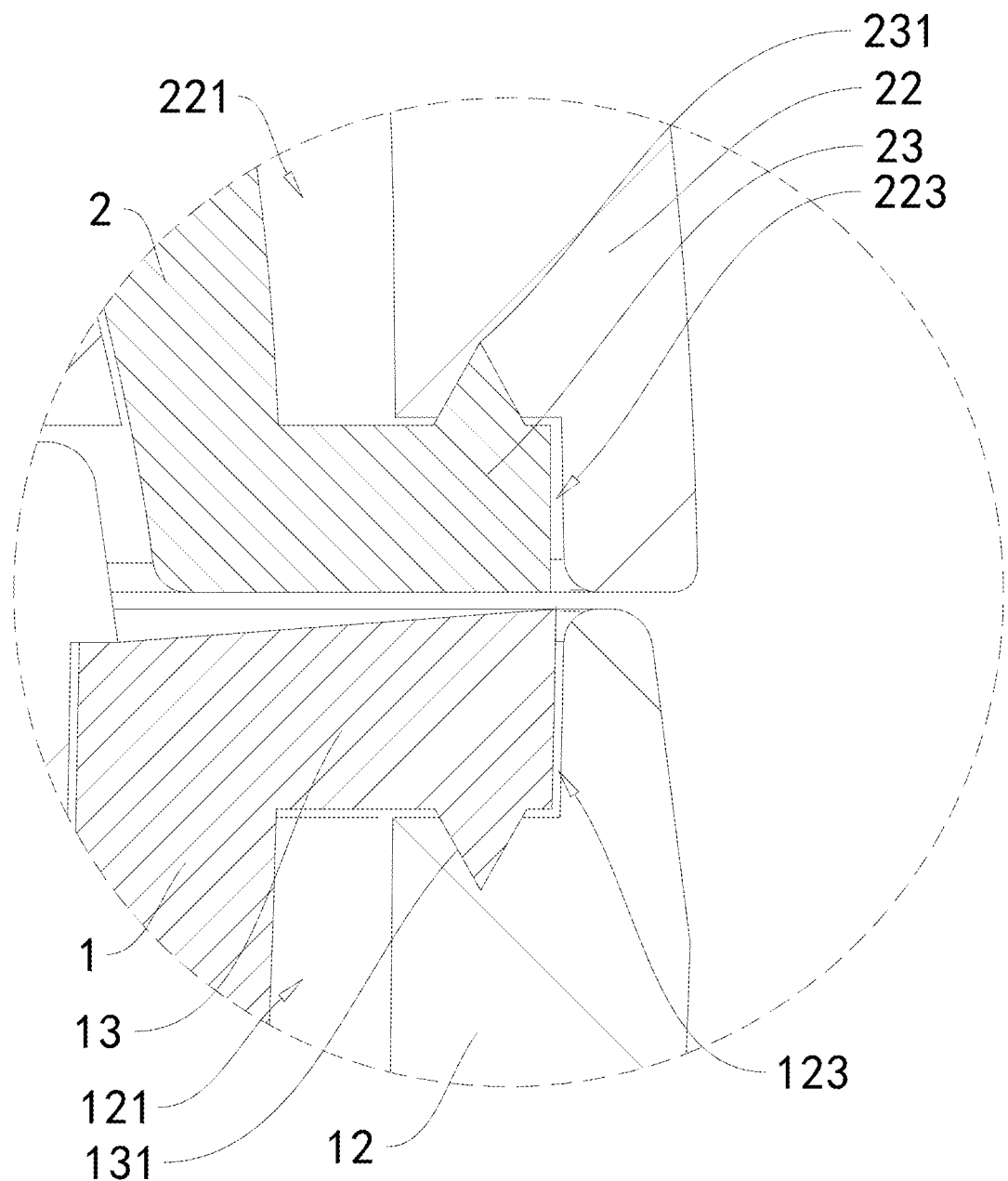
FIG. 6 is an enlarged view of part A of FIG. 5.

Referring to FIGS. 5 and 6, a first connection ring 13 is fixedly connected to one side of the compartment body 1 close to the compartment cover 2. The first decorative cover 12 is provided with a first connection groove 123. When the first decorative cover 12 is connected to the compartment body 1, the first connection ring 13 runs through the first connection groove 123; a width of the first connection ring 13 is 1.5 times a depth of a groove body of the first connection groove 123. A second connection ring 23 is fixedly connected to one side of the compartment cover 2 close to the compartment body 1. The second decorative cover 22 is provided with a second connection groove 223. When the second decorative cover 22 is connected to the compartment cover 2, the second connection ring 23 runs through the second connection groove 223. A width of the second connection ring 23 is 1.5 times a depth of a groove body of the second connection groove 223. In this embodiment of the present application, the width of the first connection ring 13 is a vertical distance that the first connection ring 12 away from one side of the compartment body 1 to the compartment body 1; and the width of the second connection ring 23 is a vertical distance that the second connection ring 23 away from one side of the compartment cover 2 to the compartment cover 2.

Referring to FIGS. 5 and 6, a distance between the compartment body 1 and the first decorative cover 12 is not to be too narrow, thereby rendering the first filling material 122 flows more smoothly in the first decorative cavity 121, and a distance between the compartment cover 2 and the second decorative cover 22 is not too narrow, thereby rendering the second filling material 222 flows more smoothly in the second decorative cavity 221.

Referring to FIGS. 5 and 6, the first connection ring 13 is fixedly connected to a first sealing ring 131. When the first connection ring 13 runs through the first connection groove 123, the first sealing ring 131 abuts against the groove body of the first connection groove 123 and seals a connection position between the first connection ring 13 and the first connection groove 123. The second connection ring 23 is fixedly connected to a second sealing ring 231. When the second connection ring 23 runs through the second connection groove 223, the second sealing ring 231 abuts against the groove body of the second connection groove 223 and seals a connection position between the second connection ring 23 and the second connection groove 223.

Referring to FIGS. 5 and 6, an arrangement of the first sealing ring 131 and the second sealing ring 231 ensures the connection sealing between the compartment body 1 and the first decorative cover 12 to be better, as well as the connection sealing between the compartment cover 2 and the second decorative cover 22 to be better. This renders it difficult for the first filling material 122 flows out of the first decorative cavity 121 and for the second filling material 222 flows out of the second decorative cavity 221.

Figure 7:
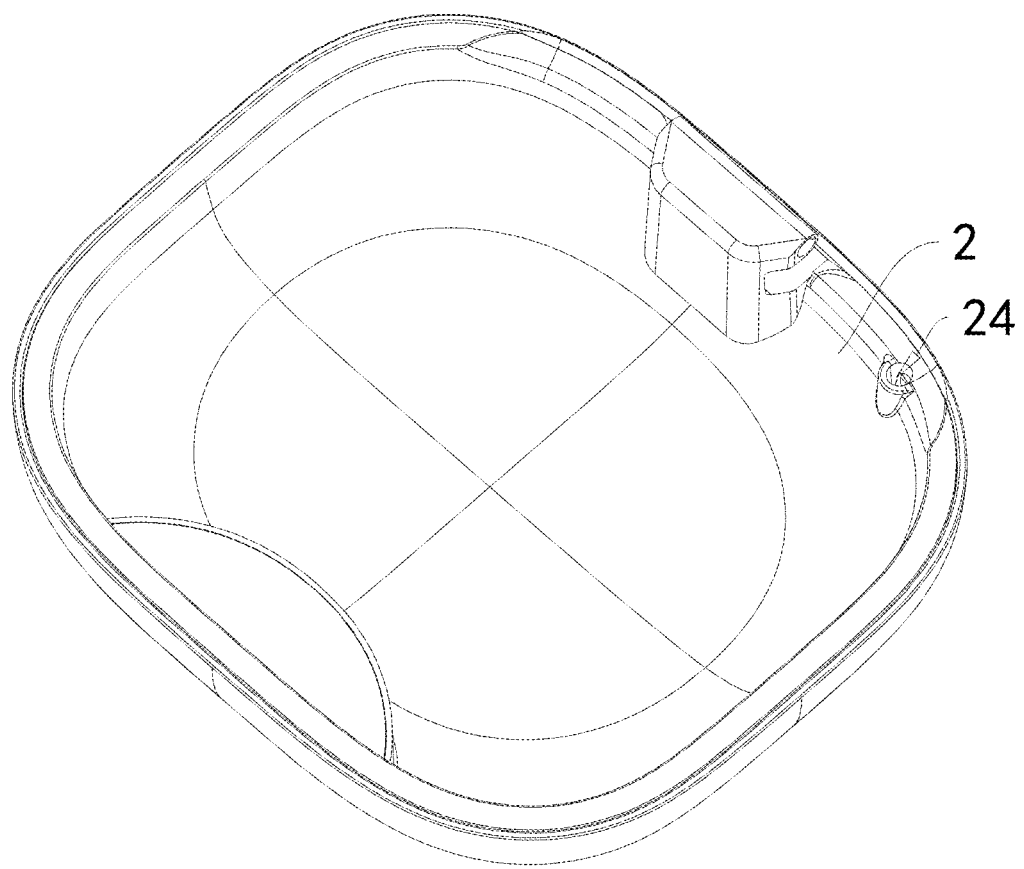
FIG. 7 is a schematic structural diagram of a compartment cover of an embodiment of the present application.
Figure 8:
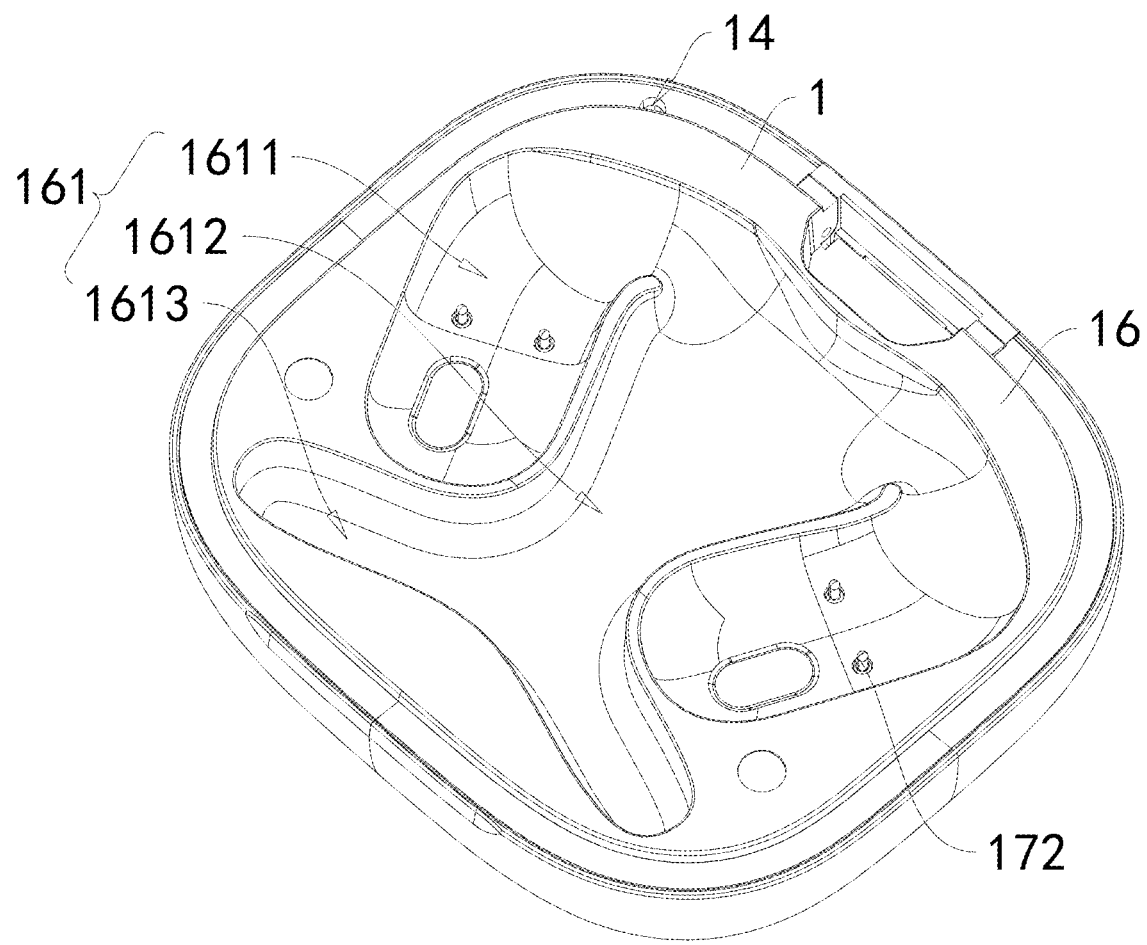
FIG. 8 is a schematic structural diagram of a compartment body of an embodiment of the present application.

Referring to FIGS. 7 and 8, the compartment body 1 is provided with a first filling hole 14 that is penetrated, the first filling hole 14 is communicated with the first decorative cavity 121. The compartment cover 2 is provided with a second filling hole 24 that is penetrated, and the second filling hole 24 is communicated with the second decorative cavity 221. This makes the filling of the first filling material 122 in the first decorative cavity 121 easier and more convenient, and the filling of the second filling material 222 in the second decorative cavity 221 easier and more convenient. In this embodiment of the present application, when the filling of the first filling material 122 in the first decorative cavity 121 and the filling of the second filling material 222 in the second decorative cavity 221 are completed, cylindrical rod-shaped members will be used to seal the first filling hole 14 and the second filling hole 24, respectively.

Figure 9:
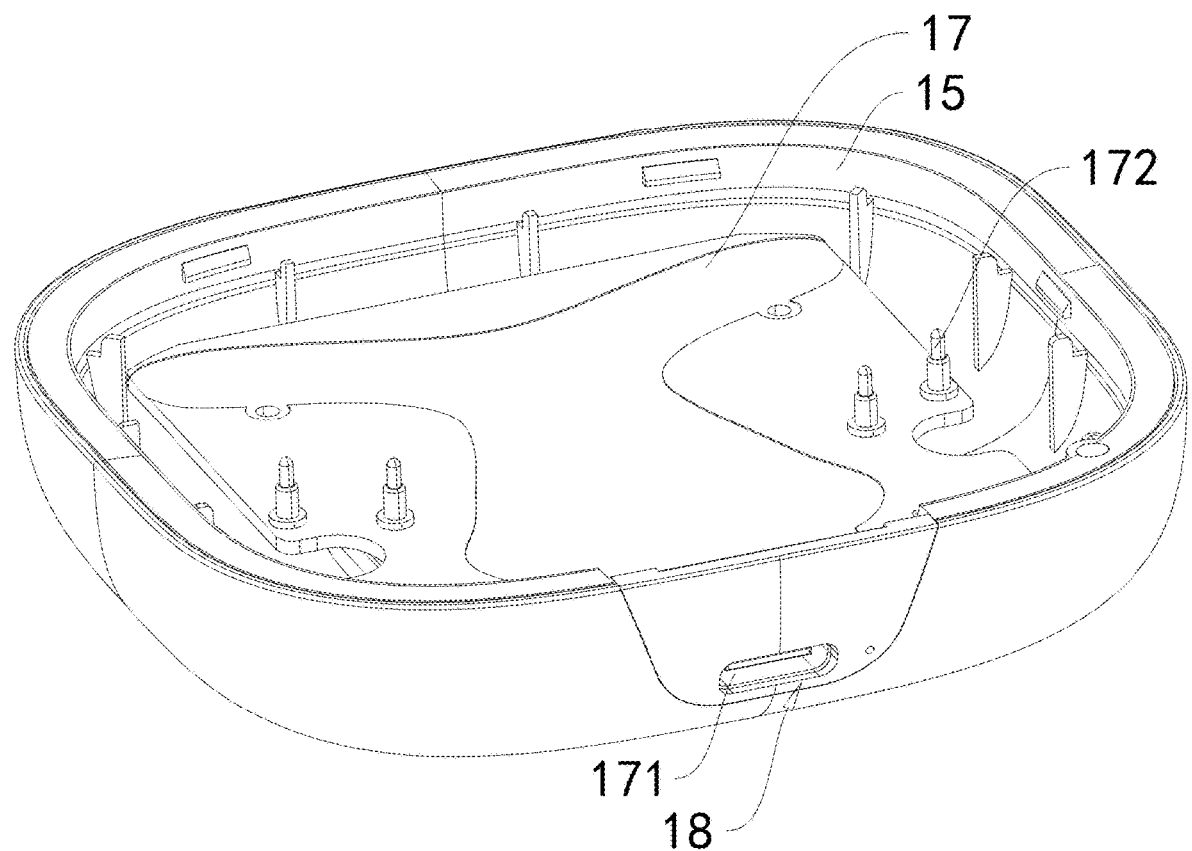
FIG. 9 is a schematic structural diagram of a control module in an embodiment of the present application.
Figure 10:
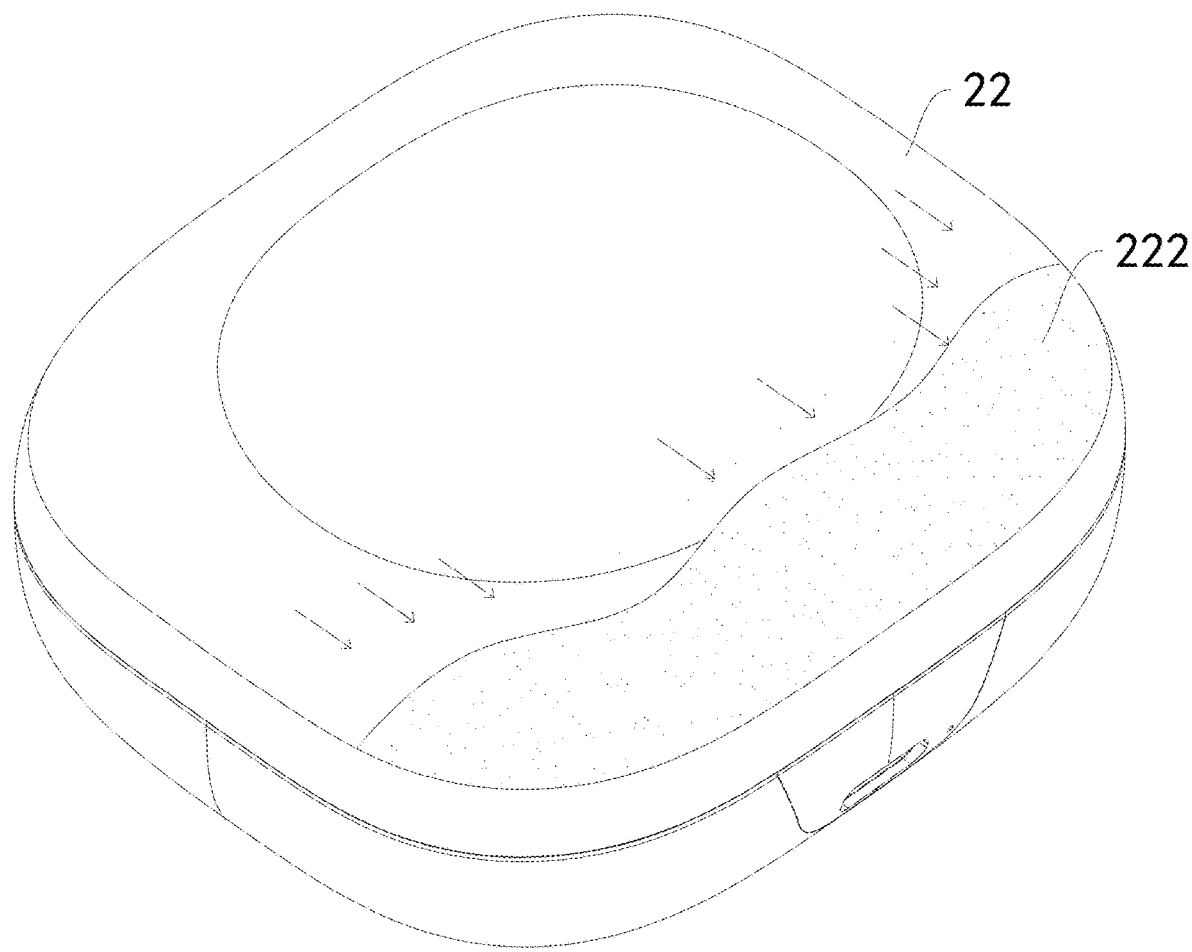
FIG. 10 is a schematic diagram of an appearance of the earphone compartment.

Referring to FIGS. 8 and 9, the compartment body 1 includes a protective part 15 and an accommodation part 16. The accommodation part 16 is fixedly connected to the protective part 15, and the accommodation part 16 is located between the protective part 15 and the compartment cover 2. The accommodation part 16 is provided with two accommodation slots 161 near the compartment cover 2. When the compartment cover 2 is connected to the compartment body 1, the compartment cover 2 seals the two accommodation slots 161, both of the two accommodation slots 161 are configured to accommodate the Bluetooth earphones.

Referring to FIGS. 8 and 9, each of the two accommodation slots 161 includes a first slot 1611, a second slot 1612, and a third slot 1613. Cross-section of the first slots 1611 are rectangular, and the first slots 1611 are configured to accommodate a main body of the Bluetooth earphones. The two second slots 1612 are communicated to each other and configured to accommodate a middle part of the Bluetooth earphones. The third slots 1613 are configured to accommodate an end part of the Bluetooth earphones.

Referring to FIGS. 8 and 9, the first slots 1611 accommodate the main position of the Bluetooth earphones, and the third slots 1613 accommodate the end position of the Bluetooth earphones, so that when the accommodation slots 161 accommodate the Bluetooth earphones, a limiting effect on the Bluetooth earphones is better, rendering it difficult for the Bluetooth earphones to move. Furthermore, the second slots 1612 are communicated to each other, rendering a space utilization of the two accommodation cavities better, thereby reducing the length and size of the compartment body 1.

Referring to FIGS. 8 and 9, a control module 17 is fixedly provided in the compartment body 1. The control module 17 is located between the protective part 15 and the accommodation part 16 and is configured to control an overall circuit of the earphone compartment. The control module 17 is fixed and electrically connected to a charging module 171. The compartment body 1 is provided with a charging port 18 that is penetrated. The charging module 171 runs through and clamped to fit with the charging port 18. The control module 17 is fixed and electrically connected to two sets of charging rods 172; one ends of the two sets of charging rods 172 away from the control module 17 are respectively located in the two accommodation slots 161 and configured to charge the Bluetooth earphones.

The implementation principle of the luminescent earphone compartment in this application is as follows: when the earphone compartment is in use, the first filling material 122 flows in the first decorative cavity 121, and the second filling material 222 flows in the second decorative cavity 221, thereby rendering the appearance structure of the earphone compartment present a gradually changing effect of fluidity, improving the fixed color and structural design when the earphone compartment is manufactured, rendering the appearance structure of the earphone compartment less likely to change during use and appearing monotonous during use.

The above are the preferred embodiments of the present application and do not limit the protection scope of the present application. Therefore, any equivalent changes made according to the structure, shape, and principle of the present application should be included in the protection scope of the present application.

What is claimed is:

1. A luminescent earphone compartment, comprising a compartment body and a compartment cover,
   wherein one end of the compartment cover is hinged to one end of the compartment body, a first decorative cover is fixedly connected to one side of the compartment body away from the compartment cover,
   a first decorative cavity is formed between the compartment body and the first decorative cover,
   a second decorative cover is fixedly connected to one side of the compartment cover away from the compartment body,
   a second decorative cavity is formed between the compartment cover and the second decorative cover,
   the first decorative cavity is filled with a first filling material, and the second decorative cavity is filled with a second filling material, the first filling material is capable of being flowed in the first decorative cavity, and the second filling material is capable of being flowed in the second decorative cavity,
   both the first decorative cover and the second decorative cover are made of transparent material.

2. The luminescent earphone compartment according to claim 1, wherein the first filling material and the second filling material are made of the same material;
   both the first filling material and the second filling material comprise particulate matter of a luminescent material.

3. The luminescent earphone compartment according to claim 2, wherein the first filling material and the second filling material further comprise an oil substance,
   both the first filling material and the second filling material are composed of a mixture of the particulate matter and the oil substance.

4. The luminescent earphone compartment according to claim 1, wherein a first connection ring is fixedly connected to one side of the compartment body close to the compartment cover, and a first connection groove is provided on the first decorative cover;
   when the first decorative cover is connected to the compartment body, the first connection ring runs through the first connection groove,
   a width of the first connection ring is 1.5 times or more a depth of a groove body of the first connection groove;
   a second connection ring is fixedly connected to one side of the compartment cover close to the compartment body,
   the second decorative cover is provided with a second connection groove;
   when the second decorative cover is connected to the compartment cover, the second connection ring runs through the second connection groove,
   a width of the second connection ring is 1.5 times or more a depth of a groove body of the second connection groove.

5. The luminescent earphone compartment according to claim 4, wherein the first connection ring is fixedly connected to a first sealing ring, and when the first connection ring runs through the first connection groove, the first sealing ring abuts against the groove body of the first connection groove and seals a connection position between the first connection ring and the first connection groove;
   the second connection ring is fixedly connected to a second sealing ring; when the second connection ring runs through the second connection groove, the second sealing ring abuts against the groove body of the second connection groove and seals a connection position between the second connection ring and the second connection groove.

6. The luminescent earphone compartment according to claim 1, wherein the compartment body is provided with a first filling hole that is penetrated, the first filling hole is communicated with the first decorative cavity,
   the compartment cover is provided with a second filling hole that is penetrated, the second filling hole is communicated with the second decorative cavity.

7. The luminescent earphone compartment according to claim 1, wherein the compartment body comprises a protective part and an accommodation part, the accommodation part is fixedly connected to the protective part, and the accommodation part is provided with two accommodation slots, the two accommodation slots are configured to accommodate Bluetooth earphones, and the two accommodation slots are communicated.

8. The luminescent earphone compartment according to claim 7, wherein each of the two accommodation slots comprise a first slot, a second slot, and a third slot, wherein the first slots are configured to accommodate a main body of the Bluetooth earphones, the second slots are communicated to each other and configured to accommodate a middle of the Bluetooth earphones, and the third slots are configured to accommodate an end of the Bluetooth earphones.

9. The luminescent earphone compartment according to claim 1, wherein the other end of the compartment body is fixedly connected to a first magnet, and the other end of the compartment cover is fixedly connected to a second magnet;

when the compartment body is connected to the compartment cover, the first magnet and the second magnet are magnetically attracted and fixed.

10. The luminescent earphone compartment according to claim 1, wherein a control module is fixedly provided in the compartment body;

the control module is fixedly and electrically connected to a charging module;

the compartment body is provided with a charging port that is penetrated, and the charging module is penetrated and clamped to fit with the charging port.

\* \* \* \* \*